Patented Oct. 9, 1934

1,976,327

UNITED STATES PATENT OFFICE 1,976,327

RECLAIMING RUBBER

Fayette Dudley Chittenden, Nutley, N. J., assignor to Rubber Regenerating Company, Naugatuck, Conn., a corporation of Indiana No Drawing. Application September 6, 1930, Serial No. 480,191

4 Claims. (Cl. 18—52)

This invention relates to improvements in the reclamation of rubber from waste rubber goods, and particularly to processes of reclaiming rubber from combinations of rubber and fibres of cellulosic nature such as occur in tires, mechanical rubber goods, and the like.

It is well-known to digest comminuted or broken-up rubber scrap with either acid or alkali at elevated temperatures to decompose the constituent cotton fibres and to soften the rubber, and subsequently to wash out the decomposed cellulosic matter and recover the rubber by mechanical means or by further heat treatment or by both. This process is relatively expensive due to the chemicals and apparatus necessary and further renders difficult the recovery of a rubber reclaim that is free from alkali or acid or their effects. Due to the use of such alkali or acid the physical and chemical properties of the rubber are frequently modified to an undesirable degree. These and other disadvantages are overcome or avoided by the use of the invention described below.

An object of this invention is to provide a process for recovering the rubber present in rubber scrap such as tires, etc. without the necessity of employing the customary acid or alkali treatment for destroying the cotton fibres therein. A further object is to provide a simple and direct way of separating the cotton and like material from waste or scrap rubber-fibre combinations to give an improved reclaim. Other objects will be apparent from the following description.

Accordingly the invention comprises broadly disintegrating or decomposing the cellulosic matter present in rubber-fibre combinations such as tires, mechanical rubber goods etc. by subjecting the cracked or broken-up waste material to the action of micro-biologically active agents capable of destroying or dissolving the cellulosic matter, and subsequently recovering the rubber substantially free from the disintegrated cellulosic matter. The expression "micro-biologically-active agent" is meant to include those organisms which are capable of destroying cellulose by liquefaction and/or conversion of the same into gaseous substances. Among such organisms are enzymes, aerobic bacteria and anaerobic bacteria including thermophilic and mesophilic bacteria of both types, yeast, and fungi, such as are common to dung, decomposing vegetable matter, river slime, intestinal tracts of animals, sludge from Imhoff tanks, septic tanks, sewerage screens, soil containing humus, etc.

The following embodiments are illustrative of the invention but are not to be construed as limiting thereof. The parts are by weight:

Example 1.—100 parts of a comminuted mixture of waste rubber and cellulosic material such as may be prepared by cracking automobile tires and containing approximately 30–50 parts of cellulosic material and 50–70 parts of rubber are introduced into a container. The mixture is covered with water and the following nutrients added:

| | Parts |
|---|---|
| Ammonium nitrate | 2.5 |
| Dipotassium hydrogen phosphate | 1.0 |
| Sodium chloride | 1.0 |
| Calcium carbonate | 2.0 |

This mixture is inoculated with bacteria from sewage sludge obtained from a sewage disposal plant and incubated at about 50° C. for a length of time sufficient to allow complete decomposition of the cellulosic matter. The time required to destroy the cellulosic matter may vary from several days to several weeks depending upon the activity of the biological agent employed. The end point is observed by determining when the gas evolution ceases or by analysis of the rubber stock from time to time. The rubber is then separated by filtration and washing. Instead of employing a temperature of 50° C. a lower temperature such as 25° C. may be employed thereby increasing the activity of the mesophilic bacteria present in the sludge. Instead of using the sludge itself a seed culture may be taken from one active batch and transferred to another batch to initiate or accelerate the operation of the second batch, or the process may be made continuous by withdrawal and renewal of the stock, agents and nutrients.

Instead of carrying out the process under anaerobic conditions the cracked up waste rubber may be placed in an open vessel with free access of air using nutrients such as those indicated above and inoculating with a mixture containing cellulose-destroying fungi such as are present in decomposing vegetable matter or soil containing the same.

It is to be understood that the temperatures employed may vary with the biological agent or combination of biological agents present and it is not desired to limit the invention to the exact conditions of temperature, pH, or concentration or nature of nutrients given in the examples, because each strain of bacterium or fungus has its own optimum temperature, optimum pH, and optimum concentration and composition of nutrients and these may be varied as is found suitable. The invention also includes the use of suitable buffer materials to maintain a desired condition of neutrality or minimum acidity where propagation of the biological agent requires such a condition. In some cases a pure culture may be available and in other cases merely a concentrated culture which is difficult to purify. Either of these sources of cellulose-decomposing bodies may be employed in place of the entire environment such as the sludge mentioned in Example 1.

Since there are a large number of different types of cellulosic-destroying biological agents and since it is believed that the actions of these agents in nearly all cases are symbiotic, it is difficult to state clearly the actual biological influences or bodies that act in each case, but the following are mentioned as typical: Bacilli such as *Bacillus amylobacter, Bacillus methanigenes, Bacillus fossicularium*, and fungi such as those belonging to the species Aspergillaceae and Penicillium.

The rubber may be recovered from the treated mass by any suitable operation or series of operations. The means employed may be filters, decanters, centrifugals, washers or the like. The rubber which is substantially free from cellulosic matter may be further treated in any desired manner such as, grinding, autoclaving with steam and/or chemicals under pressure, mechanical working etc., as may be required to reduce the rubber to a commercially utilizable condition. It is clear that the invention may be applied to known processes of reclaiming rubber at any point where it is desired to separate rubber from cellulosic material.

Since the invention allows the preparation of reclaims without the customary use of acid or alkali, the number of chemical substances which may be employed as softening agents in the subsequent plasticizing operations may be enlarged, since many softening agents are decomposed when heated with acid or alkali. The bacterial or like treatment will also allow a reduced overall cost and simplify reclaiming operations. For example, in the case of tires these may be cracked and submitted to bacterial decomposition in large tanks. The contents of the tanks may be drained through suitable screens and washed to remove the decomposed cellulosic matter and other non-rubber substances present. The rubber may be taken directly from the screens and autoclaved with steam and/or chemicals. Subsequent milling, refining, straining, sheeting, etc. will give a finished reclaim. It is thus clear that several of the steps employed in the present processes for reclaiming rubber fiber mixtures are eliminated, such as drastic washing after digesting, drying, etc. It is also clear that, when a source of cracked tires, mechanical rubber goods, etc., substantially free from cellulosic matter and containing no water extractable acid or alkali is available, the subsequent operations may be varied to give a much wider variety of finished reclaims than can be obtained with the present processes.

The expression "cellulosic" is to be contemplated broadly as including substantially pure cellulose, ligno-cellulose, hemi-cellulose, oxy or hydrocellulose and decomposition products or derivatives of cellulose, such as are present for example in the fabric portions of tires or other rubber goods reinforced with cellulosic materials and which are adaptable to modification by influences of heat and oxidation and various chemicals used in manufacturing operations. The invention may be applied to rubber goods wherein the rubber is combined in cured or uncured condition with cellulosic materials, and the rubber may be compounded or uncompounded with the various compounding ingredients. By "rubber goods" is meant manufactured goods containing combinations of fibres or fabric of cellulosic nature and rubber or rubber-like materials such as balata, gutta percha etc.

With the detailed disclosure above given, it is obvious that various modifications will suggest themselves and it is not desired to limit the invention otherwise than as set forth in the appended claims.

Having thus described my invention, what I claim and desire to protect by Letters Patent is:

1. A process of recovering rubber from goods having cellulosic materials closely and intimately associated with the rubber portions which comprises subjecting goods of said character in finely divided form and at an elevated temperature to the action of thermophilic anaerobic cellulose-destroying bacteria prevalent in sewage sludge, washing the rubber portions free of the degraded cellulosic materials and associated non-rubber products, and subsequently recovering a rubber reclaim substantially free of cellulosic materials.

2. A process of recovering rubber from goods reinforced by cellulosic fibres embedded in the rubber and encased thereby which comprises subjecting goods of said character in finely divided form to the action of cellulose-destroying microbiologically-active agents prevalent in sewage sludge for a sufficient length of time to disintegrate the cellulosic fibres, separating the rubber portions from the degraded cellulosic material and associated non-rubber products, and subsequently recovering a rubber reclaim substantially free of cellulosic materials.

3. A process of recovering rubber from goods having cellulosic material closely and intimately associated with the rubber portions which comprises subjecting goods of said character in finely divided form and submerged in water at an elevated temperature to the action of thermophilic anaerobic cellulose-destroying bacteria prevalent in sewage sludge for a sufficient length of time to disintegrate the cellulosic materials, separating the rubber portions from the disintegrated cellulosic materials and subsequently recovering a rubber reclaim substantially free of cellulosic materials.

4. A process of recovering rubber from tire scrap material and the like, which comprises subjecting the same in broken down form and while submerged in water at an elevated temperature to the action of thermophilic anaerobic cellulose-destroying bacteria prevalent in sewage sludge for a sufficient length of time to convert the cellulosic substances of said material to an easily separable form, washing the rubber portions free of the converted cellulosic substances and associated non-rubber products, and subsequently recovering a rubber reclaim substantially free of cellulosic materials.

F. DUDLEY CHITTENDEN.